United States Patent
Perlman et al.

(10) Patent No.: US 6,768,740 B1
(45) Date of Patent: Jul. 27, 2004

(54) COORDINATING LOOP-FREE FORWARDING TABLE UPDATES

(75) Inventors: Radia J. Perlman, Acton, MA (US);
Ariel Hendel, Cupertino, CA (US);
Daniel R. Cassiday, Topsfield, MA (US)

(73) Assignee: Sun Microsystems, Inc., Palo Alto, CA (US)

(*) Notice: Subject to any disclaimer, the term of this patent is extended or adjusted under 35 U.S.C. 154(b) by 799 days.

(21) Appl. No.: 09/633,969

(22) Filed: Aug. 8, 2000

(51) Int. Cl.⁷ .............................................. H04L 12/28
(52) U.S. Cl. ...................................... 370/392; 370/238
(58) Field of Search ................................. 370/230, 231, 370/238, 252, 389, 392, 255, 256, 402

(56) References Cited

U.S. PATENT DOCUMENTS

| | | | | |
|---|---|---|---|---|
| 5,353,283 A | * | 10/1994 | Tsuchiya | 370/392 |
| 6,473,421 B1 | * | 10/2002 | Tappan | 370/351 |
| 6,567,380 B1 | * | 5/2003 | Chen | 370/238 |

OTHER PUBLICATIONS

"A Simple Approximation to Minimum–Delay Routing," *Computer Communication Review*, a publication of ACM SiGCOMM, vol. 29, No. 4, Oct. 1999.

"Loop–Free Routing Using Diffusing Computations," *IEEE/ACM Transactions on Networking*, vol. 1, No. 1, Feb. 1993.

* cited by examiner

*Primary Examiner*—Wellington Chin
*Assistant Examiner*—William Schultz
(74) *Attorney, Agent, or Firm*—Joseph H. Born, Esq.; Foley Hoag LLP (57) ABSTRACT

A central node in a network computes for, and sends to, each node a forwarding table which consists of the set of neighbors to which the node should forward a message intended for a particular destination. The message includes a version number in the packet field header indicating which forwarding table version the node should use to forward the packet. The node does not begin marking and forwarding packets according to the new version number immediately. The node may wait a period of time after receiving the new table or may wait until receiving notification from the fabric manager to begin using the new version number. When a node receives a message from an end node, it inserts either the most recently received version number in one embodiment or uses the version dictated by the fabric manager in another embodiment. If the node receives a message from another node with a forwarding table version not resident at the node, the node will forward the packet with the most recent version of the forwarding table it has resident and change the version in the message accordingly prior to forwarding.

27 Claims, 9 Drawing Sheets

COORDINATING LOOP-FREE FORWARDING TABLE UPDATES

BACKGROUND OF THE INVENTION

1. Field of the Invention

The present invention relates to coordinating updates of forwarding tables in network nodes. More particularly, the present invention relates to updating forwarding tables in a network wherein the tables are determined by a central manager.

2. Description of the Related Art

A typical network consists of nodes and links. A node is a device capable of sending messages to, or receiving messages from, other nodes on the network. Examples of nodes include networked appliances, personal digital assistants, workstations, servers, storage devices, switches, routers, or any other device capable of sending and receiving messages. Nodes are connected (literally or logically) to other nodes by one or more links. The network uses switches and routers to determine over which links a message travels from one node to another. This determination is made according to a locally resident table called a "forwarding table".

Sometimes the topology between nodes changes. That is, some nodes may be added, removed, non-operative, moved, or replaced. The topology changes may lead to a condition known as a "loop". A loop occurs when a message is routed by some nodes based on an old topology and by other nodes based on a current topology, with the result being that the message loops between two nodes without being successfully delivered to its ultimate destination.

Various algorithms for loop free forwarding may be used to determine which links are used and which are not to create a unique path from one node to another. The algorithms construct forwarding tables to implement the unique path. One well known method for determining a loop free network is the spanning tree algorithm. The spanning tree algorithm determines a minimum cost tree structure for loop free forwarding. For the purposes of this discussion and simplicity, any node having the ability to forward a message on or within a network will be termed a switch, and any node that does not participate in routing decisions is called an end node.

The topology of the network is dynamic. Nodes or links may change for reasons including node or link failure, planned downtime, removal, upgrade, or any other reason that causes the network to change. When such a change occurs, the algorithms must be run again and the switches must be appraised of the new topology.

In some networks, each switch implements an algorithm to create its forwarding table from control messages passed between switches. Periodically, the switch runs the algorithm and creates a new forwarding table based on the new information. The benefit of each switch creating and maintaining its own forwarding table is that the system is not dependent on a central point of failure for routing information.

In other networks, a single node computes and distributes forwarding tables to the other nodes as needed. This method is beneficial because a central node is better able to create both loop free and dead lock free routing. A dead lock situation might occur when the resource needs of different flows are in conflict.

In either case, all nodes cannot be simultaneously aware of topology changes. During the time the switches are becoming aware of the topology changes either from their own determination or from receiving a new forwarding table from the computing node, there may be loops. Loops might occur when some switches are forwarding according to outdated forwarding tables and some switches are forwarding messages according to updated forwarding tables.

Some rules have been developed for maintaining loop-free forwarding in distributed routing algorithms, i.e., those algorithms in which each node is responsible for computing its own forwarding table. The bridge spanning tree algorithm, for example, requires nodes to wait for an amount of time known as the "pre-forwarding delay" prior to forwarding a message on a link not previously used in the previous spanning tree.

Another algorithm to provide loop-free forwarding and directed to distance vector routing, relies on the coordination between the switches and the delay in switching forwarding tables until the topology changes are known to have been disseminated. This technique is described in "Loop-free Routing Using Diffusing Computations," by J. J. Garcia-Luna-Aceves, IEEE/ACM Transactions on Networking, February 1993.

Unfortunately, none of the above widely-known techniques for maintaining loop-free forwarding apply to networks in which a central node computes and disseminates loop-free forwarding tables.

BRIEF SUMMARY OF THE INVENTION

The present invention provides a system and method for forwarding messages that includes coordinating the distribution of forwarding tables. The invention includes a version identifier included in a message control portion which indicates which version of the forwarding table to use. For the purposes of this discussion, messages may be referred to as "packets".

According to one embodiment, a switch receives a packet including its version identifier. If the version of the forwarding table is not resident on the switch, then the switch changes the version identifier to represent an earlier version of the forwarding table. The method then forwards the packet according to the version of the forwarding table represented by the received or updated version identifier as appropriate. When a packet comes from an end node, the method marks the packet with an indication of the most recently received version of the forwarding table. Additionally, when a packet is received with an invalid or absent version identifier, the method marks the packet with an indication of the most recently received version of the forwarding table In another embodiment, the invention provides receiving a packet including a version identifier and forwarding the packet according to the version of the forwarding table associated with the version identifier wherein different packets may be forwarded according to different forwarding tables.

In another embodiment, the method provides a current table identifier which identifies which version of the forwarding table is currently being used to mark packets from end nodes. When a packet is received from an end node the method marks the packet with an indication of the current table version. A marked packet, either just recently marked from the receiving switch or previously received from another switch, is forwarded according to the version identified in the packet.

In an additional embodiment, when a packet is received that indicates a version of the forwarding table greater than the current table identifier, the method forwards the packet according to the version identified in the packet. In an additional embodiment, the method can modify the current table identifier to reflect the version indicated in the packet.

In still another additional embodiment, if the version identifier received in the packet is less recent than the version of the current table, the method modifies the version identifier in the packet to reflect the current table and forwards according to the current table.

The method may buffer packets in different buffers according to the version such that different versions have different buffers. This buffering is provided to prevent dead lock.

The invention also provides a method of updating forwarding tables in a plurality of switches. A central manager calculates new forwarding tables for each switch and sends each switch its respective table. Once the central manager has determined that all switches have received the new tables, the central manager indicates that each switch may begin using the just recently received forwarding table.

In an additional embodiment, the central manager provides an indication to each of the switches that the switch may delete an old version of the forwarding table after the central manager has determined that all of the switches have received the just recently sent forwarding table.

A system according to the invention provides a memory for storing forwarding tables, a receiver for receiving packets and determining the forwarding table version in the control portion of the packet, and a forwarding unit configured to forward the packets according to the version identifier. The system may also include a modifying unit for modifying the version identifier in the control portion of a packet. The unit may be configured to modify the version identifier to indicate a version earlier than that indicated in the packet.

In an alternative embodiment, the system includes a current table identifier which indicates a current table in use and a modifying unit. The modifying unit may mark packets received from end nodes with an identifier of the current table. The modifying unit may also modify the version in the packet to indicate the current table if the version identified in the packet is of a version earlier than the current table. The modifying unit may also modify the current table identifier if the version identified in the packet is of a version later than the current table. The version identifier in the packet may be represented as a single bit.

Furthermore, a plurality of buffer may be provided each for buffering packets with the same version identifier. This buffering is provided to prevent dead lock.

BRIEF DESCRIPTION OF THE DRAWINGS

The accompanying drawings, which are incorporated in and constitute a part of this specification, illustrate at least one embodiment of the invention and, together with the description, serve to explain the principles and advantages of the invention. In the drawings.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments illustrated, but is to be accorded the widest possible scope consistent with the principles.

Reference will now be made in detail to implementations consistent with the principles of the present invention as illustrated in the accompanying drawings. Wherever possible, the same reference numbers will be used throughout the drawings and the following description to refer to the same or like parts.

Consistent with the principles of the present invention, a central node in a network computes a forwarding table for each node in the network and sends each forwarding table to the respective node. The forwarding table consists of the set of neighbors to which the node should forward a message intended for a particular destination and contains a version identifier.

Each message or packet transmitted across the network contains a field for indicating which forwarding table version the node should use to forward the packet. Nodes receiving packets from an end node place a version identifier in the packet prior to forwarding it.

When a node receives a new forwarding table it saves the table in its memory, but does not immediately use it to forward all packets. When an end node presents a packet to the switch, the switch marks the packet with the most recently received version of the forwarding table and forwards the packet according to that most recently received forwarding table. When the node receives a packet from another switch, it determines whether it has the version of the forwarding table found in the packet header. If it does not have the appropriate version, it modifies the version identifier in the packet to reflect the switch's most recently received version and forwards the packet accordingly. When the switch does have the identified version, it simply forwards the packet according to that forwarding table.

Instead of marking every packet received from an end node with the most recently received version number, the switch may include an indicator which sets forth which version identifier to include in the packet. The version of the forwarding table in the identifier is determined by the central node.

Figure 1:
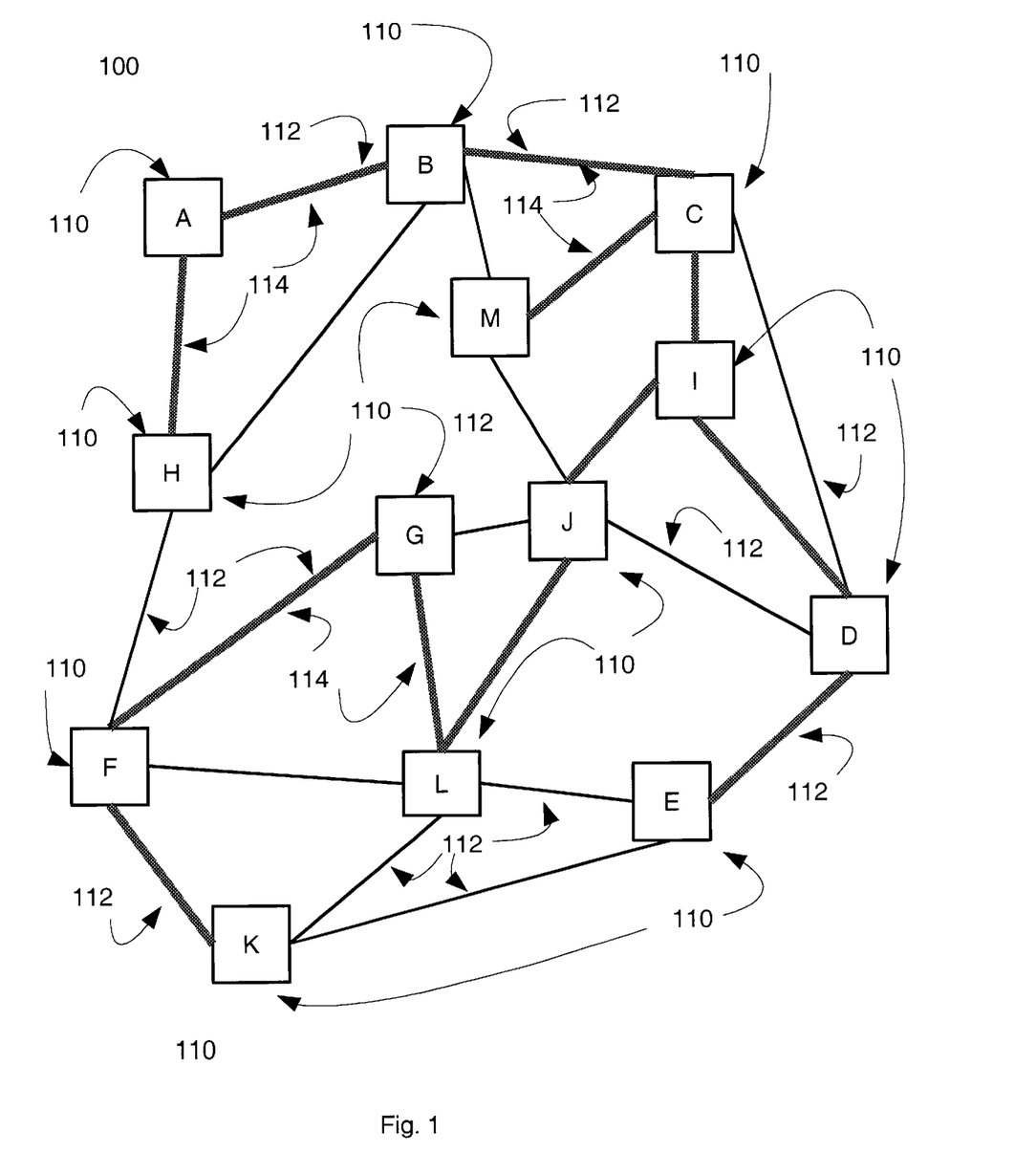
FIG. 1 is an illustration of a network topology.

FIG. 1 illustrates a network 100 of nodes 110 (labeled A through I) connected via links 112 consistent with the present invention. Links 114, having slightly wider line widths, represent one possible loop free network topology of the links 112. A complete loop free forwarding table for network 100 is illustrated in Table 1 and indicates to which neighbor a node should send a message destined for that node. In the table the first column contains the forwarding node and the first row contains the destination node. For example, if node C receives a message intended for node L, the row beginning with C indicates under column L that the message would be forwarded to node I. Each of the nodes A through K may have additional nodes or end nodes connected.

TABLE 1

Forwarding Table for FIG. 1

|   | A | B | C | D | E | F | G | H | I | J | K | L | M |
|---|---|---|---|---|---|---|---|---|---|---|---|---|---|
| A |   | B | B | B | B | B | B | H | B | B | B | B | B |
| B | A |   | C | C | C | C | C | A | C | C | C | C | C |
| C | B | B |   | I | I | I | I | B | I | I | I | I | M |
| D | I | I | I |   | E | I | I | I | I | I | I | I | I |
| E | D | D | D | D |   | D | D | D | D | D | D | D | D |
| F | G | G | G | G | G |   | G | G | G | G | K | G | G |
| G | L | L | L | L | L | F |   | L | L | L | F | L | L |
| H | A | A | A | A | A | A | A |   | A | A | A | A | A |
| I | C | C | C | D | D | J | J | C |   | J | J | J | C |
| J | I | I | I | I | I | L | L | I | I |   | L | L | I |
| K | F | F | F | F | F | F | F | F | F | F |   | F | F |
| L | J | J | J | J | J | G | G | J | J | J | G |   | J |
| M | C | C | C | C | C | C | C | C | C | C | C |   |   |

Figure 2:
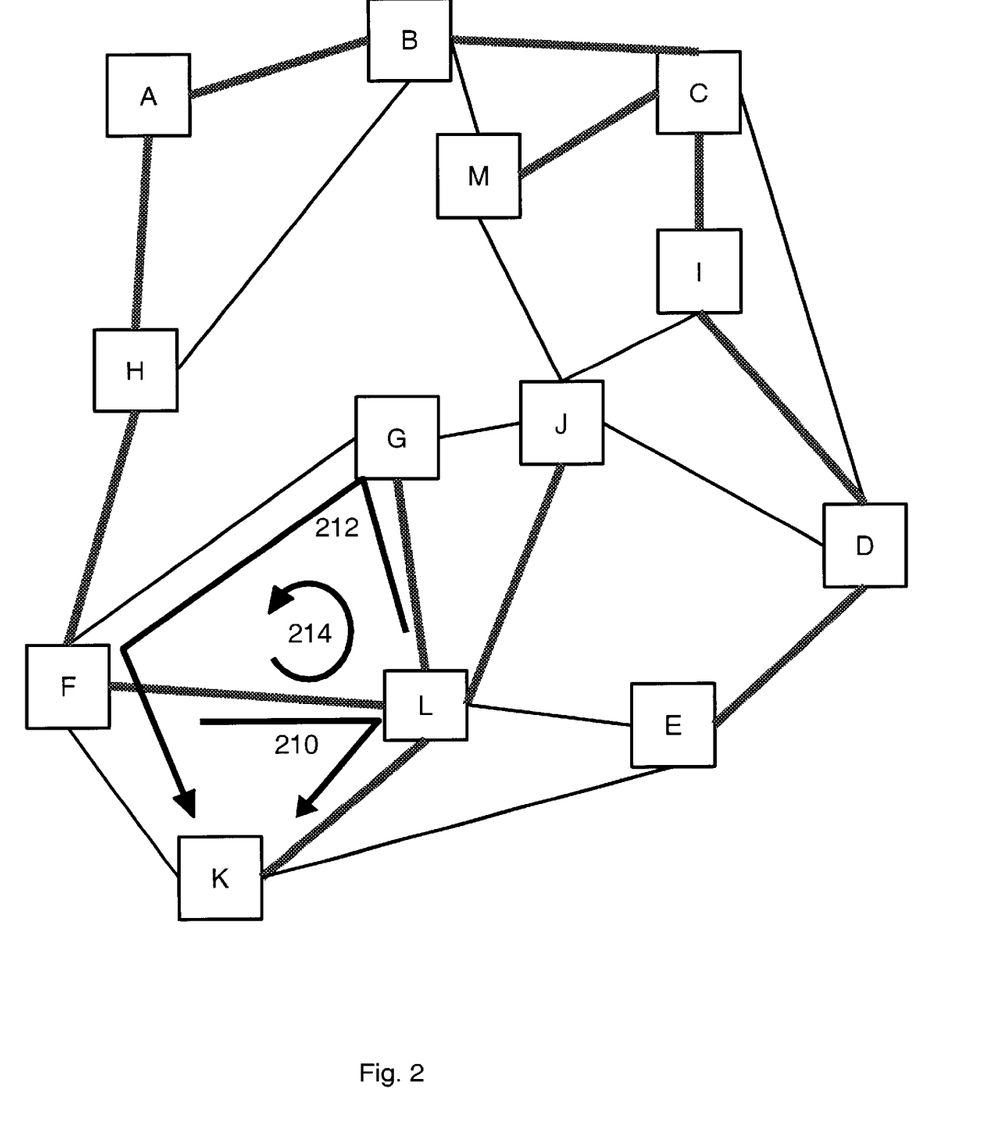
FIG. 2 is an illustration of a modification to the network topology of FIG. 1.

FIG. 2 illustrates the network 100 of FIG. 1 modified according to a new loop free forwarding topology. In FIG. 2, the links between node G and node F, node J and node I, and node F and node K are no longer being used and the links between node F and H, node F and node L, and node L and K are now being used. Table 2 illustrates the new forwarding table for network 100. According to this new forwarding table if node C needs to send a message to node L, it forwards the message to node B, unlike according to the old forwarding table of FIG. 1 where it sent the message to node I.

TABLE 1

Forwarding Table for FIG. 2

|   | A | B | C | D | E | F | G | H | I | J | K | L | M |
|---|---|---|---|---|---|---|---|---|---|---|---|---|---|
| A |   | B | B | B | B | H | H | H | B | H | B | H | B |
| B | A |   | C | C | C | A | A | A | C | A | A | A | C |
| C | B | B |   | I | I | B | B | B | I | B | B | B | M |
| D | I | I | I |   | E | I | I | I | I | I | I | I | I |
| E | D | D | D | D |   | D | D | D | D | D | D | D | D |
| F | H | H | H | H | H |   | L | H | H | L | L | L | H |
| G | L | L | L | L | L | L |   | L | L | L | L | L | L |
| H | A | A | A | A | A | F | F |   | A | F | F | F | A |
| I | C | C | C | D | D | C | C | C |   | C | C | C | C |
| J | L | L | L | L | L | L | L | L | L |   | L | L | L |
| K | L | L | L | L | L | L | L | L | L | L |   | L | L |
| L | F | F | F | F | F | F | G | F | F | J | K |   | F |
| M | C | C | C | C | C | C | C | C | C | C | C |   |   |

To illustrate the possibility of loops during forwarding table updates, consider the following example. Assume all nodes have and are using respective forwarding tables in accordance with FIG. 1 and Table 1. For whatever reason, the central manager determines that the new configuration and forwarding information represented by FIG. 2 and Table 2 needs to be communicated to all of the nodes. The central manager begins to send a new forwarding table to each of the nodes. Assume further that nodes L and G have not yet received the new forwarding information, but that node F has.

A packet received at node F destined for node K, according the new information in Table 2, must be forwarded to node L as illustrated by the path 210 in FIG. 2. Node L, however, is still using the old information found in Table 1, so it forwards the packet to G along path 212. Node G also uses Table 1 and forwards the packet back to F along path 212. The resulting loop is illustrated by the path 214 and the packet will loop continuously, never being delivered to destination node K.

Figure 3:
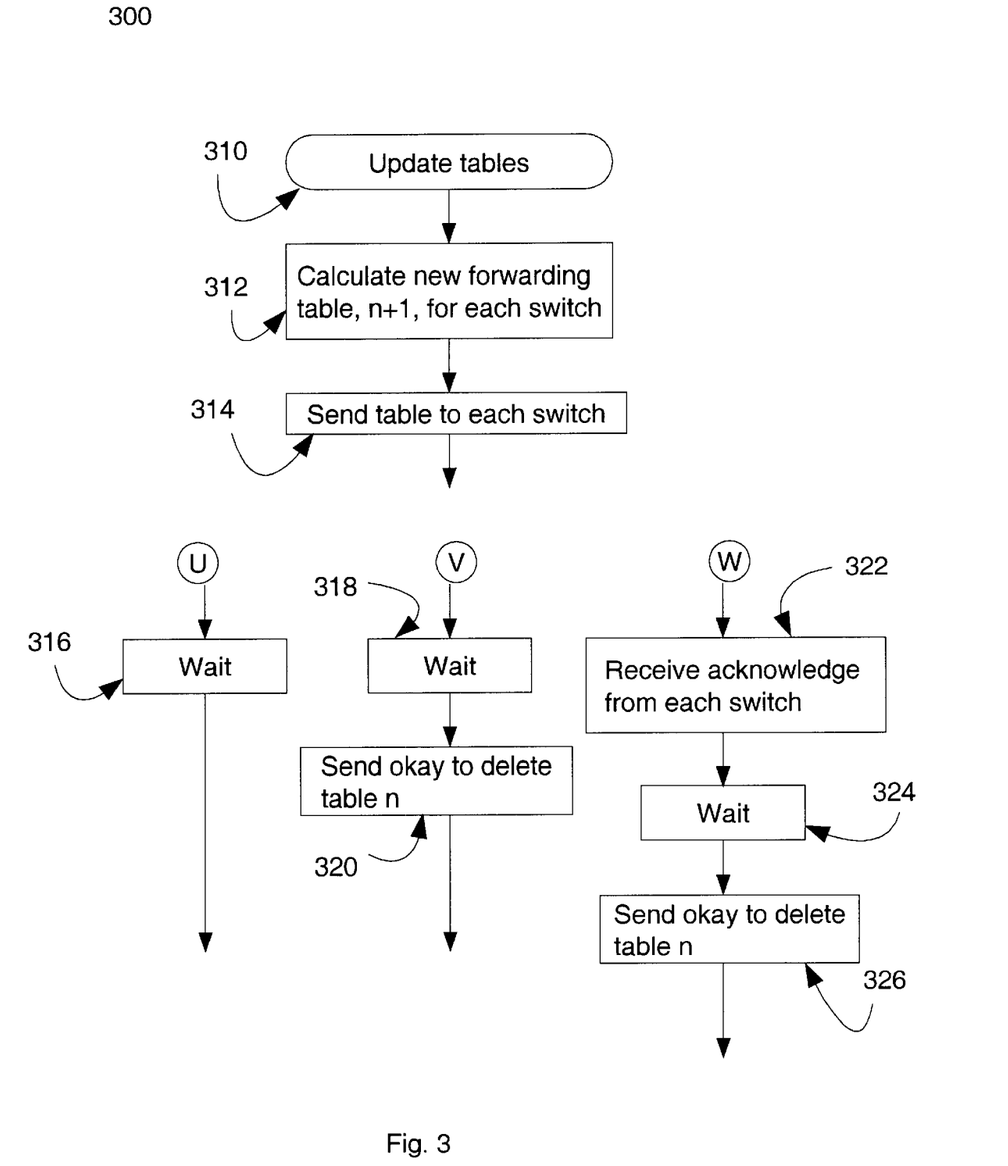
FIG. 3 is a flow chart illustrating the process of updating the forwarding tables by the central node according to the present invention.

Methods consistent with the present invention are directed toward eliminating the possibility of loops during a central manager's updating the forwarding tables in nodes. FIG. 3 illustrates an embodiment of the present invention for loop free updating according to process 300.

The central manager, also termed a fabric manager, at some point determines that the forwarding tables in the nodes are to be updated (step 310). The central manager could be any of the nodes on the network or another designated device. For the purposes of illustration, assume that node A of FIGS. 1 and 2 is currently designated as the central manager.

Node A computes a new forwarding table for each switch (step 312) based on the current state of the network and chosen routing algorithm. Assuming that the current table is n, then the new forwarding table is denoted by n+1. After computing the new forwarding table, node A sends each switch its respective table (step 314) along with an indicator of the version of the table, in this instance n+1. As mentioned above, the forwarding table received by each switch indicates to the switch to which neighbor the node should send the message to reach a particular destination node.

In one embodiment, indicated by flow U in FIG. 3, once node A has sent the message to each switch, it can wait a period of time (step 316) and then return to distributing new forwarding tables. The period of time should be chosen to safely assume that each node has received the new forwarding table n+1 and no more packets are being forwarded according to version n. One choice of this time would be the worst case time for a node to receive a packet from node A plus the worst case time for that node to send a message to another node. This handles the situation where just prior to receiving the new table n+1, the node had sent a message indicating version n.

Alternatively, as illustrated by flow V, node A can wait for a period of time (step 318) and then send a message to each switch indicating that the switch may safely delete the table version n (step 320). The period of time chosen for step 318 should be sufficient to safely assume that each switch has table n+1 prior to deleting version n.

In another alternative, illustrated by flow W, node A can wait to receive an acknowledge signal from each switch indicating that the switch has received the new table n+1 (step 322). Node A then waits a period of time (step 324). The period of time should be long enough for the last packet marked with version n to reach its destination. This time in step 324 is different from the times in steps 316 or 318 in that node A knows that each switch has received the table and does not need to rely on an uncertain worst case time for table delivery. After waiting node A can be sure that all switches have the new table and may safely send a message to each switch to delete table n (step 326).

Flows U, V, and W may be more or less critical depending on the nature of the implementation of the system in the switches. For example, if the version number of the table is presented by a single bit in the packet, then node A must be relatively certain about when to alter the version number. Alternatively, the switches may be limited in the amount of memory available to store forwarding tables and need to reuse memory by deleting old tables if needed.

Figure 4:
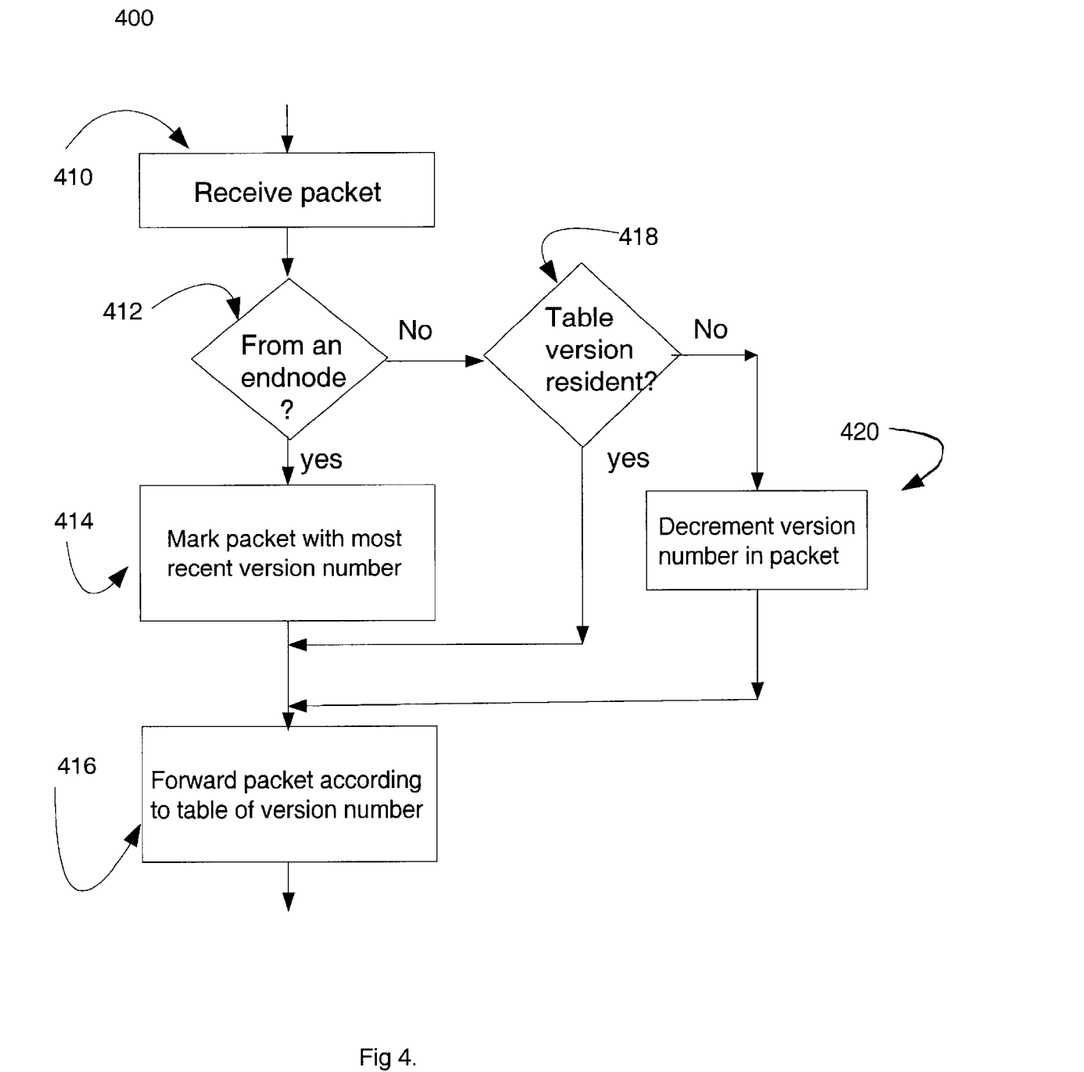
FIG. 4 is a flow chart illustrating the process of forwarding a packet by the switch according an embodiment of the present invention.

Switches operate according to an exemplary flow 400 illustrated in FIG. 4. A switch receives a packet (step 410) and determines whether the packet has come from an end node (step 412). If the packet has come from an end node, the packet will not have a valid forwarding table version indicator in the packet. The switch modifies the packet and marks it with an indication of the forwarding table most recently received by the switch (step 414). The switch then forwards the packet according to the most recently received forwarding table (step 416).

If the switch determines that the packet did not come from an end node in step 412, then control passes to step 418. At this point, the packet has come from another switch and will have a forwarding table version identifier in the packet. The switch then determines whether it has the indicated version of the forwarding table. Various methods and techniques may be used to determine whether the packet comes from an end node or a switch. For example, this determination can be made when a node determines its neighbors and/or forwards the information to the central manager. If it does, then the switch forwards the packet according to the appropriate table (step 414).

If the switch does not have the indicated version resident, then the receiving switch is some version behind the switch that sent the packet. The receiving switch decrements the version identifier to match its most recently received version (step 420). The switch could alternatively decrease the version number or make it equal to the most recently received forwarding table version. In most cases these two values will be the same. If the version number is kept using a fixed bit value, then care must be taken not to have the version wrap to a version number for which packets of that version are still being forwarded. The packet will be forwarded now to its intended destination, since all switches will still have the earlier version. In either case, the switch then forwards the packet according to the modified version identifier (step 416).

The flow represented in FIGS. 2 and 3 may result in less than desirable packet forwarding since some packets will be forwarded according to table n+1 until the packet reaches a switch that does not yet have table n+1. As an example of this situation, consider the case where a switch has yet to receive the updated table n+1. Just prior to receiving n+1, the switch receives a packet with version identifier n+1. The switch properly decrements the version number (step 420) and forwards the packet (step 416) according to the old table n. Because switches are not permitted to modify a version identifier upward, the packet will be required to finish its travel according to the path indicated by version n which may result in significant backtracking or may be dropped because the packet is being forwarded to a non existent link or node. Some packets will reach their intended destination without having to be decremented and so may use the new forwarding table for its entire path. In either event, the packet will not switch version identifiers more than once, thereby guaranteeing no loops. In the looping example path 214, the packet was never locked in to one table or another and the looping would continue until all tables were updated.

Figure 5:
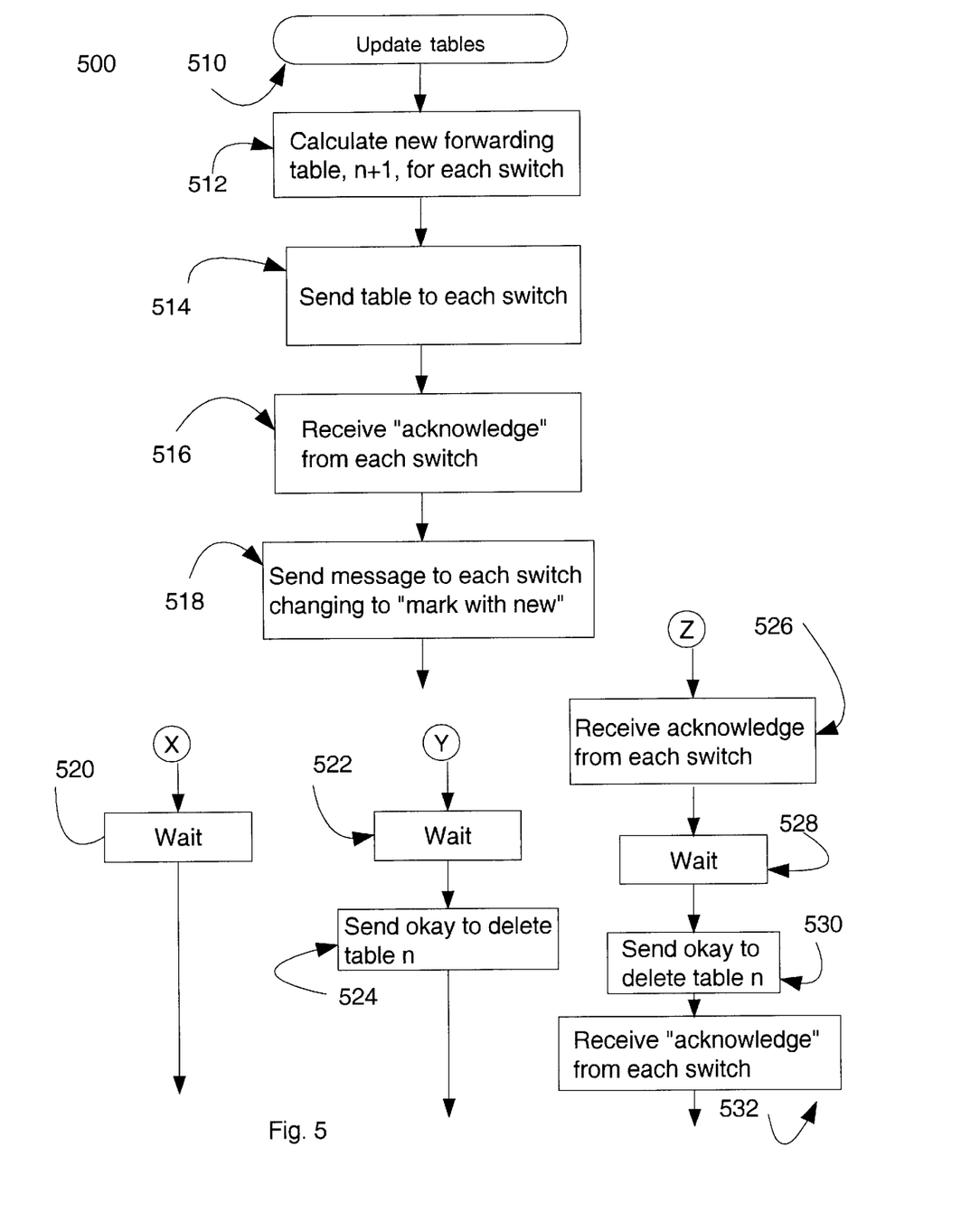
FIG. 5 is a flow chart illustrating the process of updating the forwarding table by the central node according to another embodiment of the present invention.
Figure 6:
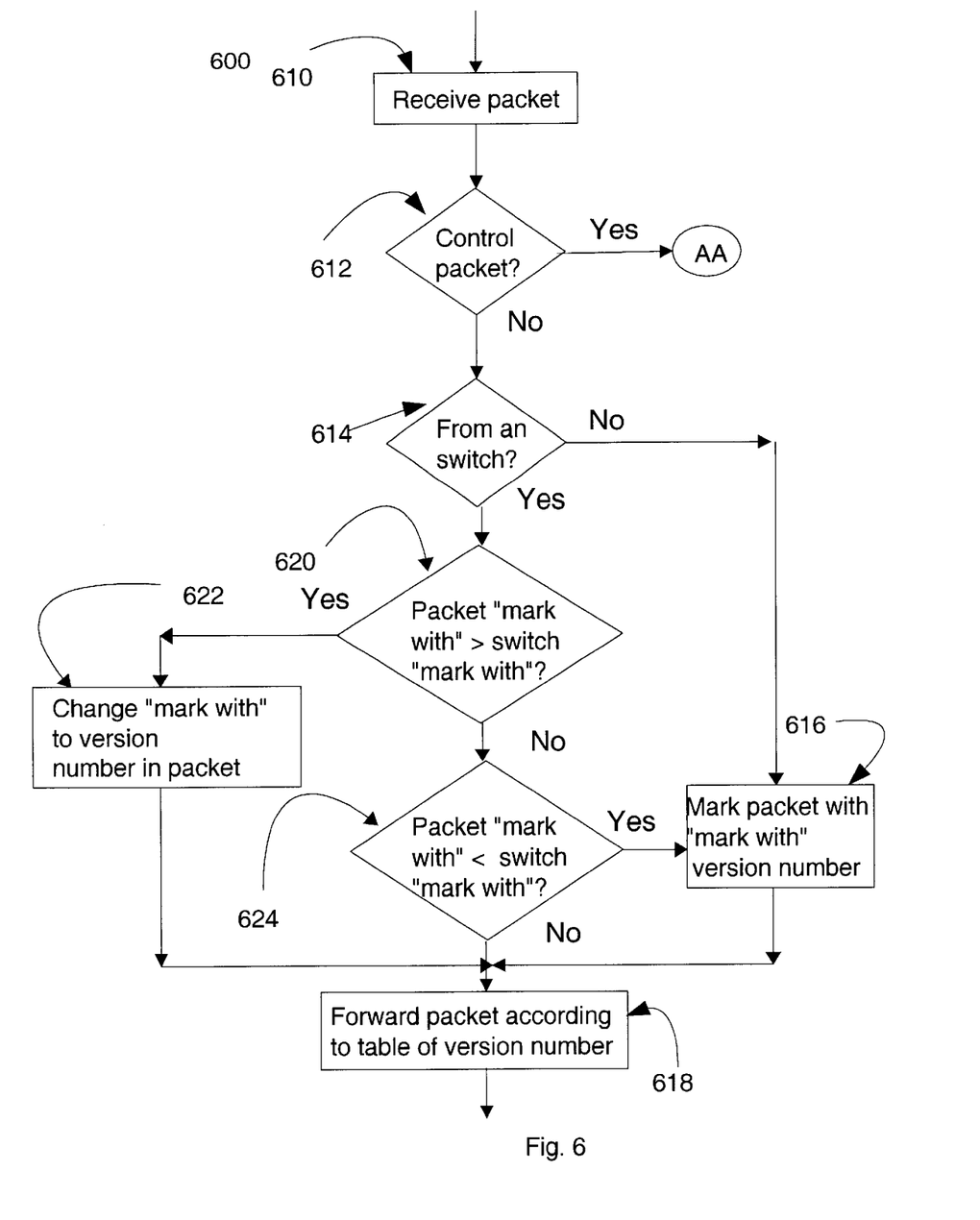
FIG. 6 is a flow chart illustrating the process of forwarding a packet consistent with the embodiment illustrated in FIG. 5.
Figure 7:
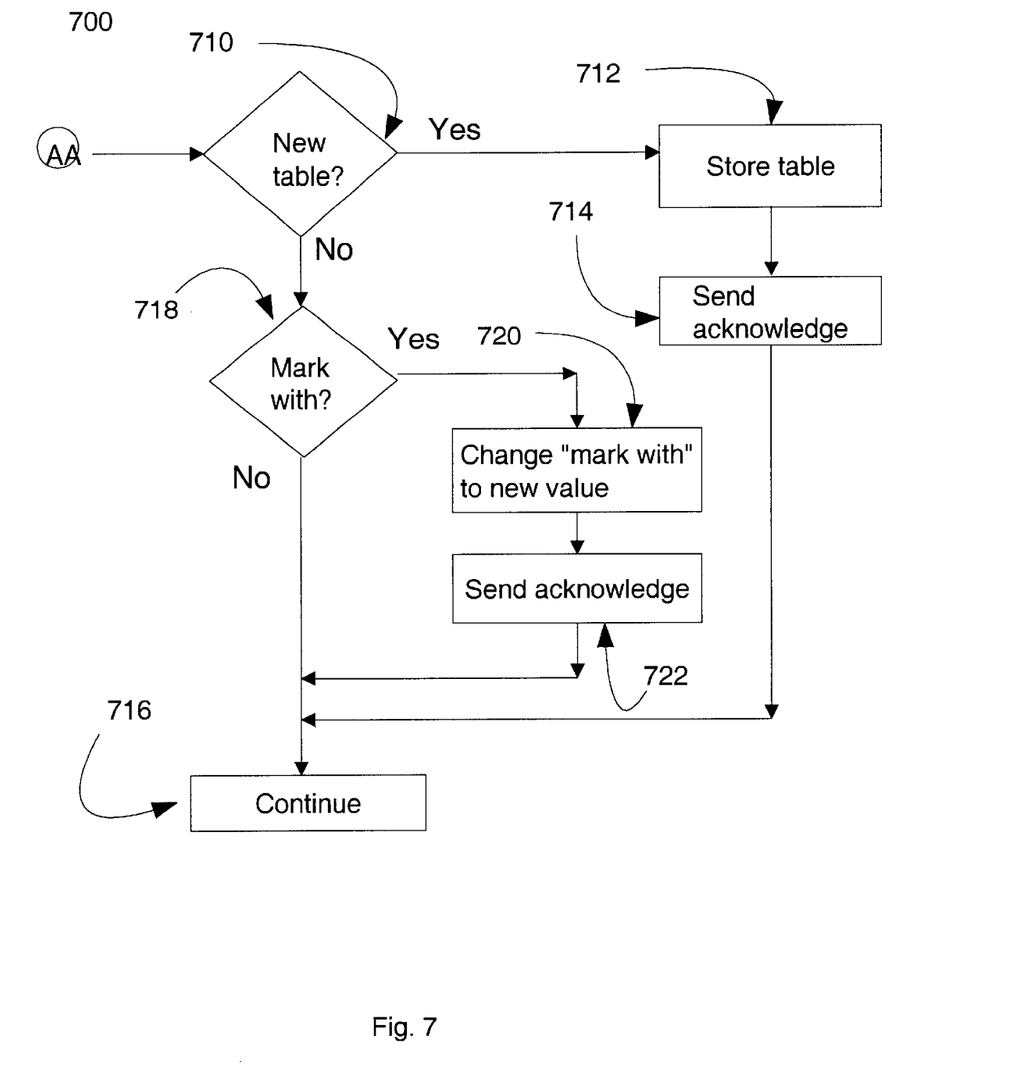
FIG. 7 is a continuation of the flow chart of FIG. 6.

An alternative embodiment consistent with the present invention and directed toward eliminating the possibility of loops during a central manager's updating the forwarding tables is illustrated in FIGS. 5 through 7. FIG. 5 illustrates the alternative embodiment according to process 500.

Similar to step 310, the central manager determines that the forwarding tables in the nodes are to be updated (step 510). For like purposes of illustration, assume that node A is again designated as the central manager.

Node A computes a new forwarding table for each switch (step 512) based on the current state of the network and chosen routing algorithm. Assuming that the current table is n, then the new forwarding table is denoted by n+1. Node A sends each switch its respective table (step 314) along with the version indicator of n+1, but includes a command to mark packets with n.

Node A waits until each switch acknowledges that it received the message generated from step 514 (step 516). After node A has received all of the acknowledgment messages from the switches, it sends a message to each switch directing the switch to mark packets with version n+1 (step 518). By the time node A has received all of the acknowledgment messages in step 516, all of the switches will have both table n and table n+1. Accordingly, any packet marked and forwarded with version n+1 after the switch receives the message generated in step 518 is guaranteed to be forwarded according to n+1 because all switches will have table n+1. All switches will still have version n so any packet having version n in the version identifier will still be forwarded according to that table.

In the embodiment, indicated by flow X in FIG. 5, once node A has sent the message to each switch, node A can wait a period of time (step 520) and then return to distributing new forwarding tables. The period of time should be chosen to safely assume that a packet marked or forwarded with version n just prior to the last node receiving the message generated in step 516 reaches its destination according to table n. One choice of this time would be the worst case time for a node to receive the message generated in step 518 plus the worst case time for that node to send to another node in the network. This is the situation where just prior to receiving the mark with n+1 command, the node had sent a message indicating version n.

Alternatively, if the nodes are not bound by certain sequence or memory limitations, it may be possible for the wait in step 520 to be zero. In this situation, only node A controls sending out the forwarding tables and would know that each switch would at least have the mark-with version, the previous version, and some of the older versions depending on how the switch implements storing the forwarding tables. One such implementation would be a first in first out (FIFO) memory technique. If the switch stores forwarding tables according to a FIFO technique of known depth, then node A can ensure proper existence of forwarding tables for the worst case.

Alternatively, as illustrated by flow Y, node A can wait for a period of time (step 522) and then send a message to each switch indicating that the switch may safely delete the table version n (step 524). The period of time chosen for step 522 should be sufficient to account for the worst case time for the last switch to receive the command from step 518 and the worst case time for a packet to travel from one node to another. This is similar to the time chosen for step 520.

In another alternative, illustrated by flow Z, node A can wait to receive an acknowledge signal from each switch indicating that the switch has received the command to mark-with version n+1 (step 526). Node A then waits a period of time (step 528). The period of time should be the worst case time for a last packet marked with version n to reach its destination. This time in step 528 is different from the times in steps 520 and 522 in that node A knows that each switch has received the command and does not need to rely on an uncertain worst case time for command delivery. After waiting in step 528 node A can be sure that all packets marked with version n are delivered and may safely send a message to each switch to delete table n (step 530). In situations where memory may be a issue with respect to storing tables, node A waits until all switches have indicated that the old tables are deleted (step 532) prior to computing new tables. Additionally, if the switch receives table n+2, it could delete table n without waiting for a message from node A.

Flows A, B, and C may be more or less critical depending on the nature of the implementation of the system in the switches. For example, if the version number of the table is presented by a single bit in the packet, then node A must be relatively certain about when to alter the version number. Alternatively, the switches may be limited in the amount of memory available to store forwarding tables and need to reuse memory by deleting old tables if needed. For example, if memory is not an issue, then after step step 528 the central manager may begin calculating new forwarding tables. Alternatively, the switches may choose not to delete the previous table.

FIG. 6 illustrates the activity in a switch via flow 600 operating in conjunction with a central manager operating in accordance with FIG. 5. The switch receives a packet (step 610) and determines whether the packet is a control packet (step 612). If the packet is not a control packet, then the switch determines whether the packet is from another switch (step 614).

If the packet is not from a switch as determined in step 614, then the packet is from an end node. The switch marks the incoming packet with the version associated with the mark-with version identifier (step 616) and forwards the packet according to that version identifier (step 618). Alternatively, instead of determining whether the packet originated from a switch or an end node, the switch may determine that the packet simply does not have a valid version identifier. The invalidity may originate from either an error or because the node did not provide a version number.

In an additional embodiment, if the switch determines that it has received a packet with a version identifier representing a version more recent than its current mark-with version (step 620), the switch can change its mark-with version to the version present in the received packet (step 622). The switch then forwards according to that table (step 618). The switch can do this adjustment because no switch would be allowed to mark a packet with a newer version (in response to receiving the message generated in step 518) unless each switch had already received the newer version according to step 516.

In another additional embodiment, if the switch receives a packet having a version identifier representing a version identifier older than its current mark-with version (step 624), the switch can modify the packet to reflect this newer version (step 616). This situation would occur when a switch that had received its mark-with update generated from step 516 received a packet from a switch that had not yet received that message. This enhancement is possible because all switches will have the newest version of the forwarding table before any switch is allowed mark packets with the new version.

Since the switch is only modifying packets in one direction (i.e., modifying the version number to a version more current then the original version) looping is prevented.

If steps 620 and 624 are not performed then the switch just forwards the packet according to the version in the received packet (step 618). The activity in the central manager in combination with the mark-with feature ensures that the switch will have the version in the packet version identifier field.

When the network is in a stable condition, i.e., there have been no table updates for a period of time then all packets will be marked and forwarded according the current version of the forwarding table. At some point the central manager determines that new tables are required. Not all switches will receive the new tables at the same time so that some switches will have the new table and some will not. However, none of switches will be marking new packets with the new forwarding version until receiving the command generated by the central manager in step 518.

When the central manager determines that all switches have received the new forwarding table in step 516, it allows switches to begin marking new packets with the new forwarding table version (step 518). As each switch receives the command, it begins to forward new packets according to the new table. This new table is the same as the mark-with version.

Because the central manager waited until all of the switches acknowledged receiving the new table in step 516 prior to the central manager sending the message to begin marking new packets with the new table version in step 518, the switch will have the new version even if it has not yet received the message to mark new packet with the new version. Because switches do not change the version identifier, the process does not suffer from loops. A packet will be forwarded according to one table throughout its entire journey.

If the packet received is control packet, then control passes from step 612 to step 710 as illustrated in FIG. 7. FIG. 7 illustrates a process 700 associated with storing new tables and updating the mark-with identifier.

If the packet indicates a new table is being received (step 710), then the switch stores the able (step 712), send an acknowledge (step 714) and continues to other processing (step 716).

In alternative embodiments, the central manager could use various techniques to minimize traffic flow in updating the tables. If only a small subset of the tables change, then a message could be sent that would indicate the changes to the table for the next version number. For example, some switches might not have their tables changed at all. In this case, the switch would be notified that the switch should use the information from the current version for the next version. In other instances, the changes may be limited to certain switches and/or certain destinations. Accordingly, the central manager can indicate to each switch what changes are necessary to the current forwarding table to create the next forwarding table version.

If the packet represents the message the central manager has generated as a result of step 518 (i.e., a mark-with update), then the switch changes the mark-with identifier to the new value in the packet (step 720) indicating that all new packets received from end nodes are to be marked and forwarded with the new version. The switch may optionally send an acknowledgment (step 722), if for example, flow Z of FIG. 5 is being implemented. The switch may then continue to any other processing (step 716).

If the packet is not determined to be a mark-with update, then the switch continues to any other processing as required (step 716).

Figure 8:
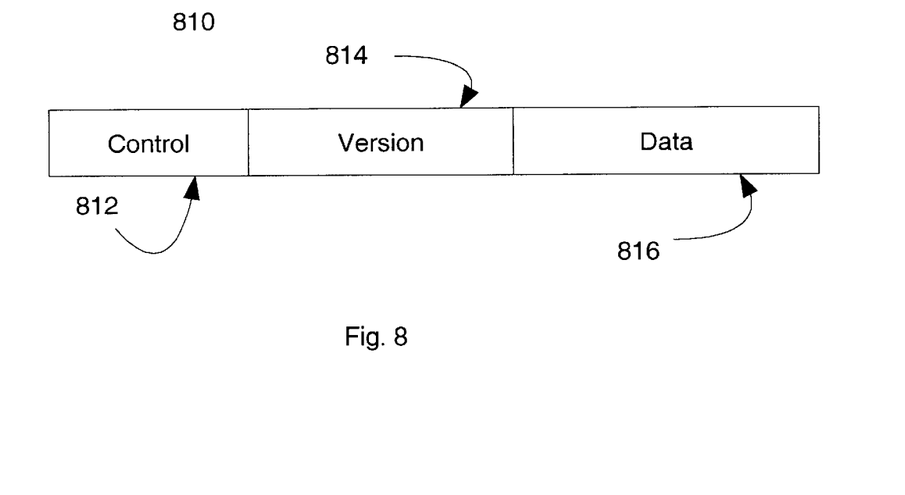
FIG. 8 is an illustration of a packet according to the present invention.

One implementation of a packet 810 according to the present invention is illustrated in FIG. 8. Packet 810 includes a control portion 812, a version identifier field 814, and a data portion 816.

Packet 810 is similar to known packets in that it includes a control portion 812 and a data portion 816. Control portion 812 may contain various control information including, but not limited to, a hop count, a destination, a source, or routing information.

Packet 810 differs from known packet by the inclusion of version identifier field 814. Version field 814 contains an indicator of the version of the forwarding table according to which the packet should be forwarded. While illustrated in FIG. 812 as distinct from the control portion 812, the version information 814 may be part of the control portion 812. The version identifier may include a single bit identifier, a sequence number, or any other information that indicates indicates and distinguishes one version from another.

In some situations a dead lock situation may occur. This might happen when multiple flows are contending for shared resources. For example and referring to FIG. 2, node A may have its buffers full waiting to send a message to node H, but H's buffers are full waiting to send a message to node B that also has its buffers full waiting to send a message to node A. None of the nodes are able to either send or receive packets in this situation.

Figure 9:
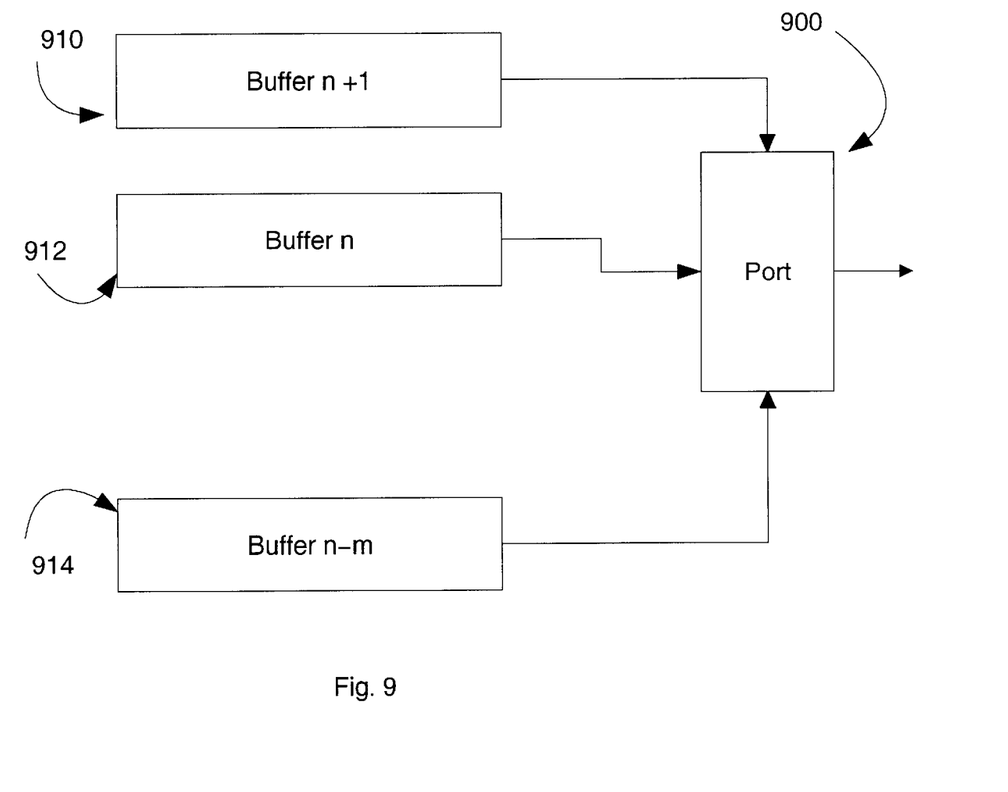
FIG. 9 is an illustration of a multiple buffer configuration for dead lock free forwarding according to the present invention.

To eliminate the possibility of dead lock situations, an embodiment of the invention may include separate buffers in the switch, each associated with a different version of the forwarding table. FIG. 9 illustrates one illustrative implementation and includes an output port 900 and buffers 910, 912 and 914.

When a switch forwards a packet it puts the packet in an output buffer according to the version identifier. For example, a packet marked with version n would be placed in buffer n 912 while a packet marked with version n+1 would be placed in buffer n+1 910. The number of buffers should be at least two, but may be any chosen number to m+2 where m is the number of versions prior to n to keep.

A node on a network embodying the present invention, may include a processor with an associated memory which may contain instructions for performing one or more steps the procedures illustrated in FIGS. 3 through 7. Persistent storage of these instructions may be in a server system remote from the network and the processor. Furthermore, instructions may be stored on a computer readable storage medium, which may be any device or medium that can store code and/or data for use by a computer system. This includes, but is not limited to, magnetic and optical storage devices such as disc drives, magnetic tape, CDs (compact disks) and DVDs (digital video discs), and computer instruction signals embodied in a transmission medium (with or without a carrier wave upon which the signals are modulated).

Figure 10:
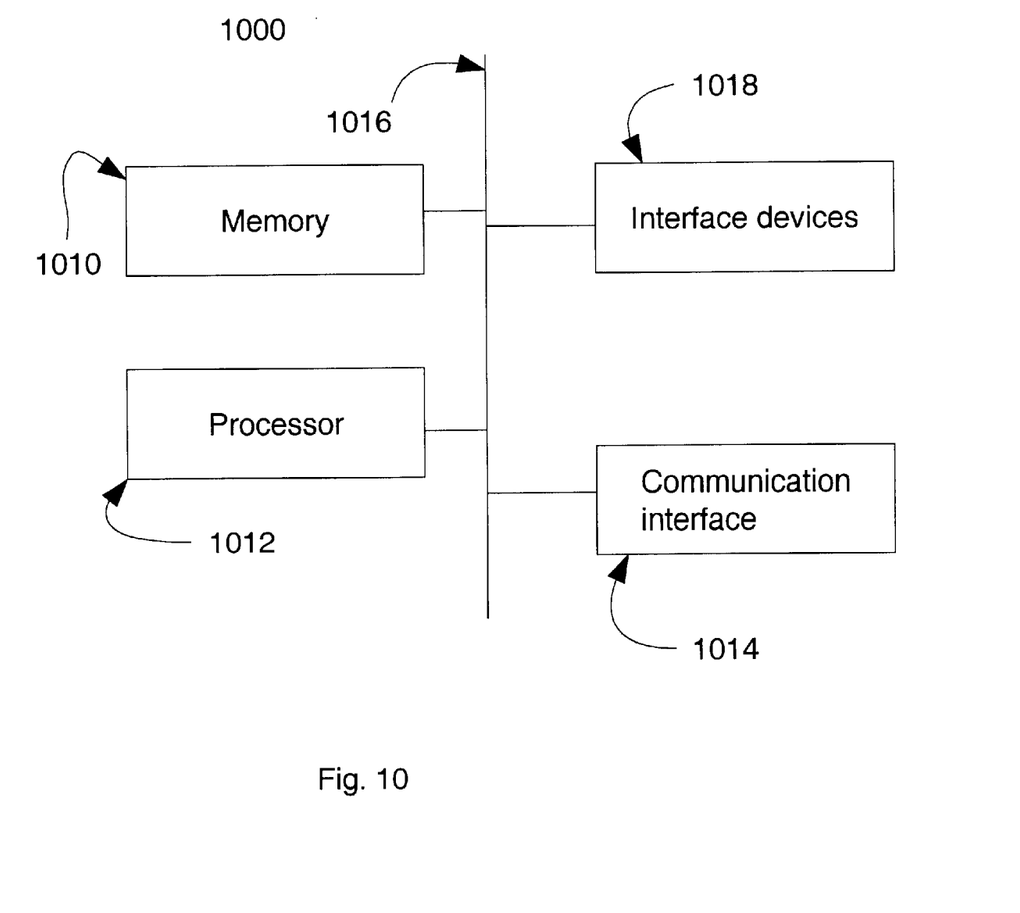
FIG. 10 is an illustration of a device capable of implementing the present invention.

FIG. 10 illustrates one such system 1000 for implementing the invention and acting as a node, end node, or central manager. System 1000 includes a memory 1010, a processor 1012, a bus 1014, a communication interface 1016, and interface devices 1018. Processor 1012 may include any type of computational engine for executing programs within system 1000. This includes, but is not limited to, a microprocessor, a device controller, and a computational device within an appliance. Memory 1010 may include any type of random access memory for storing code and data for use by processor 1012. System 1000 may also include secondary storage device 1022 which may include any type of non-volatile storage device for storing code and data for use by processor 1012 like magnetic storage devices, such as disk drives, and electronic storage devices such as a flash memory or battery backed up random access memory.

Communication interface 1016 may include any type of mechanism for communicating between computer system 1000 and any other node. This may include any type of communication medium including, but not limited to, electrical, optical. Infrared or radio signal communication pathway.

Interface devices 1018 are any types of devices used to allow a user to interact with system 1000. This may include, for example, displays, keyboards, computer mice, touch sensitive displays, audio devices, or any other device that allows users to interact with system 1000.

While the preferred embodiments of the present invention have been illustrated herein in detail, it should be apparent that modifications and adaptations to those embodiments may occur to those skilled in the art without departing from the scope of the present invention as set forth in the following claims.

What is claimed is:

1. A method for forwarding a packet comprising:
   receiving in a switch the packet including an incoming version identifier representing a forwarding table associated with the packet; and
   changing the version identifier to represent an earlier forwarding table if the forwarding table represented by the version identifier is not resident on the switch.

2. The method of claim 1, further comprising:
   forwarding the packet according to the forwarding table represented by the incoming version identifier if the version identifier was not updated,
   otherwise forwarding the packet according to the forwarding table represented by the updated version identifier.

3. The method of claim 2, further comprising:
   changing the version identifier to represent a latest forwarding table if the packet is from an end node.

4. The method of claim 2, further comprising:
   associating a buffer with the version identifier; and
   buffering the packet in the buffer associated with the version identifier.

5. A method of forwarding a packet comprising:
   storing at least one forwarding table;
   receiving a packet having a forwarding table identifier;
   determining whether the forwarding table identifier is associated with the at least one forwarding table;
   modifying the forwarding table identifier to show association with the at least one stored forwarding table if the forwarding table identifier is not associated with the at least one forwarding table; and
   forwarding the packet according to the at least one forwarding table.

6. A method for forwarding a packet comprising:
   receiving in a switch the packet including a version identifier representing a forwarding table associated with the packet; and
   modifying the version identifier in the packet if the forwarding table represented by the version identifier is not resident on the switch.

7. The method of claim 6, further comprising modifying the version identifier to reflect an earlier version identifier associated with an earlier forwarding table and forwarding the packet according to the earlier forwarding table.

8. The method of claim 7, further comprising:

modifying the version identifier in the packet if the packet is from an end node to reflect a latest version identifier associated with a latest forwarding table and forwarding the packet according to the latest forwarding table;

forwarding the packet according to the forwarding table represented by the version identifier if the forwarding table represented by the version identifier is resident on the switch.

9. A method of forwarding a packet in a switch comprising:

receiving a first forwarding table;

receiving a second forwarding table;

receiving a packet including a forwarding table identifier;

forwarding the packet according to the first forwarding table if the forwarding table identifier is associated with the first forwarding table; and forwarding the packet according to the second forwarding table if the forwarding table identifier is associated with the second forwarding table.

10. The method of claim 9, further comprising:

buffering the packet in a first buffer if the forwarding table identifier is associated with the first forwarding table; and buffering the packet in a second buffer if the forwarding table identifier is associated with the second forwarding table.

11. A method of forwarding a packet comprising:

receiving a packet including an incoming version identifier representing a forwarding table associated with the packet;

modifying the incoming version identifier if the packet is from an end node; and forwarding the packet according to the forwarding table associated with the modified version number if the version identifier was modified, otherwise the forwarding table associated with the incoming version identifier.

12. The method of claim 11, further comprising:

buffering the packet in a first buffer associated with the forwarding table corresponding to the modified version identifier if the version identifier was modified; and buffering the packet in a second buffer associated with the forwarding table corresponding to the incoming version identifier if the version identifier was not modified.

13. A method of forwarding a packet comprising:

receiving a packet; and modifying a current table identifier in accordance with a version identifier field in the packet if the version identifier field represents a version greater than the current table identifier.

14. The method of claim 13, further comprising forwarding packet according to a forwarding table associated with the current table identifier.

15. The method of claim 13, further comprising:

modifying the packet to indicate the current table identifier prior to forwarding if the version identifier field is absent or invalid.

16. The method of claim 14, further comprising:

modifying the packet to indicate the current table identifier prior to forwarding if the version identifier field represents a version lesser than the current table identifier.

17. The method of claim 15, further comprising:

modifying the packet to indicate the current table identifier prior to forwarding if the version identifier field represents a version lesser than the current table identifier.

18. A method of updating forwarding information in a plurality of switches comprising:

calculating a new forwarding table for each switch;

sending a respective new forwarding table to each of the plurality of switches;

determining whether each of the plurality of switches has received its respective new forwarding table; and sending a message to each of the plurality of switches allowing each switch to delete an old forwarding table after determining that each of the switches received its respective new forwarding table.

19. A method of updating of routing information in a plurality of switches comprising:

calculating a new forwarding table for each switch;

sending a respective new forwarding table to each of the plurality of switches;

determining whether each of the plurality of switches has received its respective new forwarding table;

sending to each switch an indication to forward according to the new forwarding table after determining that each of the switches received its respective new forwarding table.

20. The method of claim 19, further comprising:

determining whether each of the plurality of switches has received its respective indication to forward according to the new forwarding table; and sending a message to each of the plurality of switches allowing each switch to delete an old forwarding table after determining that each of the switches received its indication.

21. A system for forwarding a packet comprising:

a memory configured to store forwarding tables;

a receiver configured to receiving the packet from a node and determine a forwarding table version; and a forwarding unit configured to forward the packet according to a forwarding table associated with the forwarding table version.

22. The system of claim 21, further compromising:

a plurality of buffers each corresponding to a respective forwarding table; and the forwarding unit includes a module configured to place the packet in the buffer corresponding to the forwarding table version.

23. The system of claim 21, further compromising:

a modifying unit configured to modifying the forwarding table version in the packet if an associated forwarding table is not stored in the memory.

24. The system of claim 21, further compromising:

a current forwarding table indicator; and a marking unit is configured to modify the packet to indicate the current forwarding table.

25. The system of claim 24, wherein the current forwarding table indicator is a single bit.

26. The system of claim 25, wherein the modifying unit is configured to modify a single bit in the packet.

27. The system of claim 15, wherein the sending a respective new forwarding table includes sending an indication of the differences between the old forwarding table and the new forwarding table.

* * * * *